UNITED STATES PATENT OFFICE.

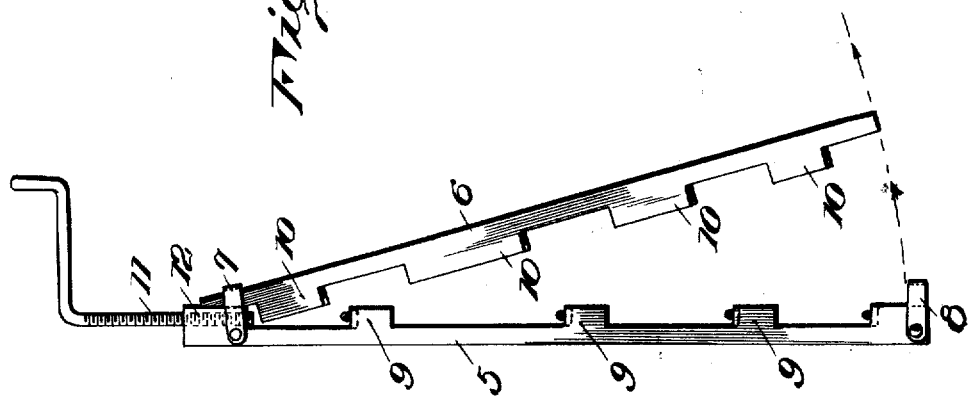
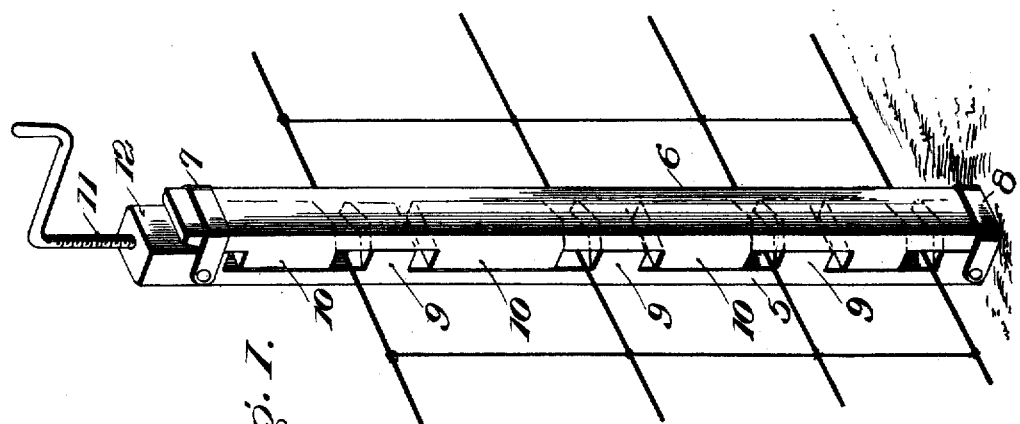

GROVER RANDOLPH, OF FLOURNOY, CALIFORNIA.

WIRE-FENCE CLAMP.

1,274,594.  Specification of Letters Patent.  Patented Aug. 6, 1918.

Application filed August 21, 1917. Serial No. 187,275.

*To all whom it may concern:*

Be it known that I, GROVER RANDOLPH, a citizen of the United States, residing at Flournoy, in the county of Tehama and State of California, have invented new and useful Improvements in Wire-Fence Clamps, of which the following is a specification.

This invention relates to devices for clamping the wire of a fence during the operation of stretching the same, and its object is to provide a device of this kind which can be readily applied to and removed from the wires, and which securely grips each wire, and which is simple, strong and durable in construction.

The objects stated are attained by means of a novel combination and arrangement of parts to be hereinafter described and claimed, and in order that the same may be better understood, reference is had to the accompanying drawing forming a part of this specification.

In the drawing

Figure 1 is a perspective view of the device, and

Fig. 2 is an elevation showing the device in open position.

In carrying out the invention there are provided two longitudinal bars 5 and 6 respectively, which are placed in face to face and contiguous relation and so held by yokes 7 and 8 at the ends thereof, the yokes being carried by the bar 5 and projecting therefrom so that the bar 6 may be slipped under the same.

On the inner face of the bar 5 are projecting lugs 9 which are spaced. Similar lugs 10 are on the inner face of the bar 6, and these lugs seat in the spaces between the lugs 9, whereas the lugs 9 seat in the spaces between the lugs 10. The lugs extend squarely across the bars, and they are designed to serve as jaws for gripping the wires, the latter seating between two adjacent lugs 9 and 10 and being gripped thereby by advancing said jaws toward each other. The wires extend between the bars 5 and 6 and transversely thereof. The coacting faces of the jaws are concave and convex, respectively, whereby the wire is crimped where it is gripped and a better hold is thus obtained.

The bar 6 is slidably connected to the bar 5, the sliding movement being in the direction of its length to advance or retract the jaws 10. This operation is effected by a screw 11 carried by the bar 5 and engaging the bar 6. The screw is threaded through a lug 12 at one end of the bar 5 in the direction of the length thereof, and its inner end engages the rear face of the first one of the lugs or jaws 10 of the bar 6. Hence, it will be evident that the bar 6 is advanced to bring its jaws 10 toward the jaws 9 when the screw 11 is turned in one direction, and when the screw is turned in the opposite direction the bar 6 may be slid back to release the wire.

The end of the bar 6 which is inserted under the yoke 7 has its inner face beveled, whereby it is here reduced in the thickness to facilitate its insertion into the yoke, and also to permit the bar 6 to be swung outward from the bar.

In use, the two bars 5 and 6 are separated by slipping the bar 6 forward until it clears the yoke 8, after which the bar 6 can be swung outward of the bar 5, the beveled end of the former permitting this movement. The bar 6 is then again slipped under the yoke 8, and the screw 11 is operated to obtain the gripping action of the jaws 9 and 10 on the wires. By a reverse of this operation the device can be readily removed from the wires after they are stretched. The stretcher, which forms no part of the present invention can be attached to the bars 5 and 6 in any suitable manner.

I claim:—

1. A wire clamp comprising a pair of longitudinal bars positioned in face to face relation, means for moving one of the bars lengthwise relative to the other, spaced projecting lugs on the inner faces of the bars, the lugs of one bar seating in the space between the lugs of the other bar, and the adjacent lugs of the respective bars having coacting jaw faces extending transversely of the bars, and yokes carried by the ends of one of the bars and embracing the ends of the other bar, said last-mentioned bar being slidable in the yokes.

2. A wire clamp comprising a pair of longitudinal bars positioned in face to face relation, means for moving one of the bars lengthwise relative to the other, spaced projecting lugs on the inner faces of the bars, the lugs of one bar seating in the space between the lugs of the other bar, and the adjacent lugs of the respective bar having coacting jaw faces extending transversely of the bars, and yokes carried by the ends of one of the bars and embracing the ends of the other bar, said last mentioned bar being slidable in the yokes, and the inner face of the last mentioned bar at one end being beveled to permit swing of said bar outward of the other bar when disengaged from the yoke at the opposite end.

In testimony whereof I affix my signature.

GROVER RANDOLPH.